United States Patent
Baudel et al.

(10) Patent No.: US 8,805,771 B2
(45) Date of Patent: *Aug. 12, 2014

(54) CONTEXTUAL FEEDBACK OF RULES PROXIMITY BASED UPON CO-OCCURENCE HISTORY IN A COLLABORATIVE RULE EDITING SYSTEM

(75) Inventors: Thomas Baudel, Paris (FR); Frank Van Ham, Geldrops (NL)

(73) Assignee: International Business Machines Corporation, Armonk, NY (US)

( * ) Notice: Subject to any disclaimer, the term of this patent is extended or adjusted under 35 U.S.C. 154(b) by 219 days.

This patent is subject to a terminal disclaimer.

(21) Appl. No.: 13/276,426

(22) Filed: Oct. 19, 2011

(65) Prior Publication Data

US 2013/0073511 A1   Mar. 21, 2013

(30) Foreign Application Priority Data

Sep. 19, 2011 (EP) .................................... 11290422

(51) Int. Cl.
*G06N 5/02* (2006.01)

(52) U.S. Cl.
USPC ........................................................... 706/60

(58) Field of Classification Search
CPC ..................................... G06N 5/02; G06F 9/44
USPC ......................................... 706/47–48, 59–60
See application file for complete search history.

(56) References Cited

U.S. PATENT DOCUMENTS

| | | | |
|---|---|---|---|
| 6,272,482 B1 * | 8/2001 | McKee et al. .................... 706/47 |
| 7,020,869 B2 * | 3/2006 | Abrari et al. .................. 717/108 |
| 8,073,801 B1 * | 12/2011 | von Halle et al. ............... 706/47 |
| 2007/0094199 A1 * | 4/2007 | Deshpande et al. ............ 706/47 |
| 2007/0112717 A1 * | 5/2007 | Serrano-Morales et al. ... 706/47 |
| 2008/0208786 A1 * | 8/2008 | Serrano-Morales et al. ... 706/47 |
| 2008/0256014 A1 * | 10/2008 | Gould et al. .................... 706/48 |
| 2009/0299949 A1 * | 12/2009 | Tan ................................. 706/59 |
| 2010/0217737 A1 * | 8/2010 | Shama ............................ 706/47 |
| 2011/0219355 A1 * | 9/2011 | Matsumoto .................. 717/106 |
| 2012/0089549 A1 * | 4/2012 | Burckart et al. ................ 706/47 |
| 2012/0254090 A1 * | 10/2012 | Burris et al. .................... 706/47 |
| 2012/0331118 A1 * | 12/2012 | Stein et al. .................... 709/223 |

* cited by examiner

*Primary Examiner* — Jeffrey A Gaffin
*Assistant Examiner* — Dave Misir
(74) *Attorney, Agent, or Firm* — Steven M. Greenberg, Esq.; CRGO Law

(57) ABSTRACT

Embodiments of the present invention provide a method, system and computer program product for providing contextual feedback of rules proximity based on co-occurrence history in a business rules management system (BRMS). In an embodiment of the invention, a method for providing contextual feedback of rules proximity based on co-occurrence history can include selecting a rule for editing in a rules editor executing in memory of a computer, identifying different rules also having been applied to an input in common with the selected rule and displaying the identified different rules in the rules editor in connection with the selected rule.

10 Claims, 1 Drawing Sheet

CONTEXTUAL FEEDBACK OF RULES PROXIMITY BASED UPON CO-OCCURENCE HISTORY IN A COLLABORATIVE RULE EDITING SYSTEM

CROSS-REFERENCE TO RELATED APPLICATIONS

This application claims priority to European Application No. 11290422.2, filed Sep. 19, 2011, which is incorporated herein by reference in its entirety.

BACKGROUND OF THE INVENTION

1. Field of the Invention

The present invention relates to the dynamic assembly of rules in a business rules management system (BRMS) and more particularly to collaborative rule editing in a BRMS.

2. Description of the Related Art

A business rule management system (BRMS) is a software system used to define, deploy, execute, monitor and maintain the variety and complexity of decision logic that is used by operational systems within an organization or enterprise. The decision logic, namely "business rules", includes policies, requirements, and conditional statements that are used to determine the tactical actions that take place in applications and systems. At the minimum, a BRMS includes a repository, allowing decision logic to be externalized from core application code, tools that allow both technical developers and business experts to define and manage decision logic, and a runtime environment in which applications can invoke decision logic managed within the BRMS and execute the decision logic using a business rules engine.

In a typical BRMS, one or more rules in a rule set are selected according to matching criteria (or exclusionary criteria) for an input. The selected rules are then applied once to the input and this process is repeated for all inputs offered to the system. Thus, to the extent rules can be modified by the end user, the use of a BRMS has been found to reduce or remove reliance on information technology (IT) departments for changes in live systems. The use of a BRMS also has been found to provide increased control over implemented decision logic for compliance and better business management, and also the ability to express decision logic with increased precision, using a business vocabulary syntax and graphical rule representations such as decision tables, trees, scorecards and flows. Finally, the use of a BRMS has been found to improve efficiency of processes through increased decision automation.

In a BRMS, like traditional middleware, multiple different users can collaboratively contribute modules of application logic, for instance, to enforce a business policy, automate a process, instantiate a transaction or produce a tangible result. These modules, referred to in the art as "execution units", are dynamically assembled into an execution engine to form a single enterprise application program. Of note, collaborative business rule editing environments like a BRMS allow business users to independently edit business rules, however, making changes to one rule in this system may require changes to related rules.

In this regard, with respect to a changed rule related to other rules, the involved variables in the related rules and the changed rule can be dependent upon one another. Alternatively, a particular rule may seem incomplete or require tuning at first glance, when in fact the rule behavior is complemented with one or more other related rules that refine the semantics of the particular rule. Finally, situations occur frequently in which the effects of a given rule are negated or altered unintentionally by another rule in the BRMS, introduced for instance by another user of the BRMS system.

Current BRMS systems provide little sense of possible aggregated effects of rule editing with respect to related rules. Further, while some context can be learned from viewing the structure of a rule to identify referenced variables and manually identifying other rules that involve the same variables, this approach necessarily excludes rules that are frequently evaluated together but share no common variables. Of course, this type of information typically cannot directly be displayed in the rule editing environment, where it would be of the most beneficial to the end user.

BRIEF SUMMARY OF THE INVENTION

Embodiments of the present invention address deficiencies of the art in respect to collaborative rule editing in a BRMS and provide a novel and non-obvious method, system and computer program product for providing contextual feedback of rules proximity based on co-occurrence history in a BRMS. In an embodiment of the invention, a method for providing contextual feedback of rules proximity based on co-occurrence history can include selecting a rule for editing in a rules editor executing in memory of a computer, identifying different rules each having also been applied to an input in common with the selected rule and displaying the identified different rules in the rules editor in connection with the selected rule.

In one aspect of the embodiment, the different rules are identified in a rule correlation table so as to have respective counts of common inputs for the selected rule that exceeds a threshold value. In a further aspect of the embodiment, the different rules are identified in a rule correlation table as having respective normalized values derived from corresponding respective counts of common inputs for the selected rule that exceeds a threshold value. In yet another, optional aspect of the embodiment, the identified different rules are first filtered and then only the filtered identified different rules are displayed in the rules editor in connection with the selected rule.

In another embodiment of the invention, a rules editing system is provided. The system includes a computer with memory and at least one processor and a datastore of rules previously applied utilizing different inputs, for example in a BRMS. A rule correlation table can be disposed in the memory of the computer correlating the rules in the datastore with one another according to commonly utilized ones of the inputs. Yet further, a rules editor can be configured to edit a selected one of the rules in the datastore. Finally, rules proximity logic can execute in the memory of the computer and can be enabled to identify different rules in the datastore that also had been applied to an input in common with the selected one of the rules in the rules editor, and to display the identified different rules in the rules editor in connection with the selected one of the rules.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for providing contextual feedback of rules proximity based on co-occurrence history in a BRMS. In accordance with an embodiment of the invention, a record can be maintained for different rules executed for different corresponding inputs. Thereafter, a table of rule co-occurrence can be created based upon commonalities between the corresponding inputs of the different rules. For example, the table of rule co-occurrences can be constructed by storing a counter for each pair (a,b) of rules in a rule set, and said counter can be incremented whenever a both rule a and rule b appear in an execution trace of a given input. Optionally, the table can be normalized to demote any influence within the table of rules applied on all inputs present in the table. Thereafter, a particular one of the rules referenced in the table can be selected for editing in the BRMS and the table consulted to identify co-occurring rules. The identified co-occurring rules can be rendered in the BRMS to indicate relatedness amongst the rules with respect to the selected rule.

Figure 1:
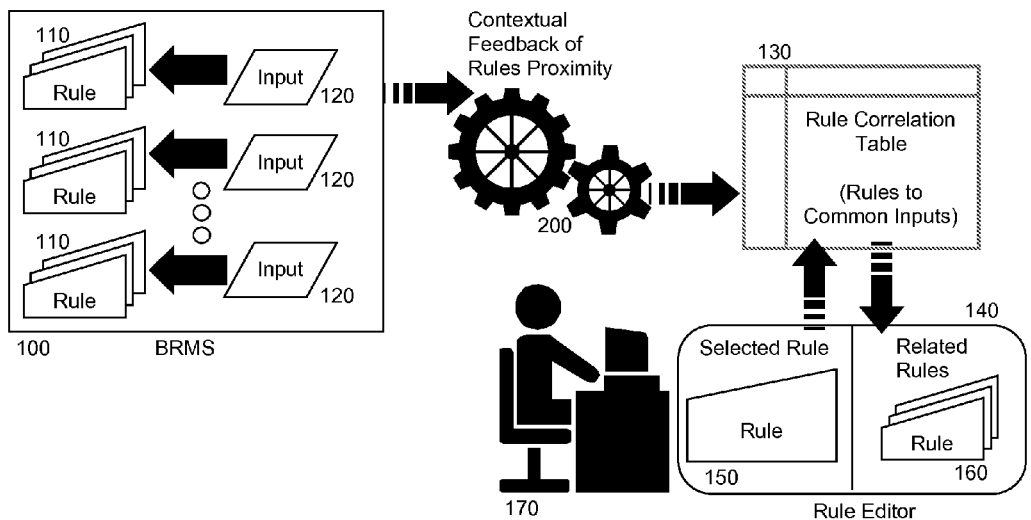
FIG. 1 is a pictorial illustration of a process for providing contextual feedback of rules proximity based on co-occurrence history in a BRMS.

In further illustration, FIG. 1 pictorially shows a process for providing contextual feedback of rules proximity based on co-occurrence history in a BRMS. As shown in FIG. 1, different rules 110 in a BRMS 100 can be identified for each of a corresponding input 120. Contextual feedback of rules proximity logic 200 can process the identified set of rules 110 for a corresponding input 120 to create a rule correlation table 130 in which pairs of the rules 110 are correlated according to a number of commonly shared input 120. Optionally, the number of commonly shared inputs 120 in the rule correlation table 130 can be normalized to remediate instances where one or more of the rules 110 act upon all available inputs 120.

An end user 170 interacting with a rule editor 140 to edit a selected rule 150 can be presented in a user interface of the rule editor 140 with a list of related rules 160 that are considered sufficiently proximate to the selected rule 150. In this regard, the contextual feedback of rules proximity logic 200 can locate within the rule correlation table 130 one or more rules 110 having a number of commonly shared ones of the inputs 120 that exceeds a threshold value. Optionally, the number of commonly shared ones of the inputs 120 can be a normalized value. Those of the rules 110 having a number of commonly shared ones of the inputs 120 can be considered sufficiently proximate to the selected rule 150 and presented as such as the related rules 160. In this way, as the end user 170 edits the selected rule 150, the end user 170 can benefit from a visual display of the related rules 160.

Figures 2, 3:
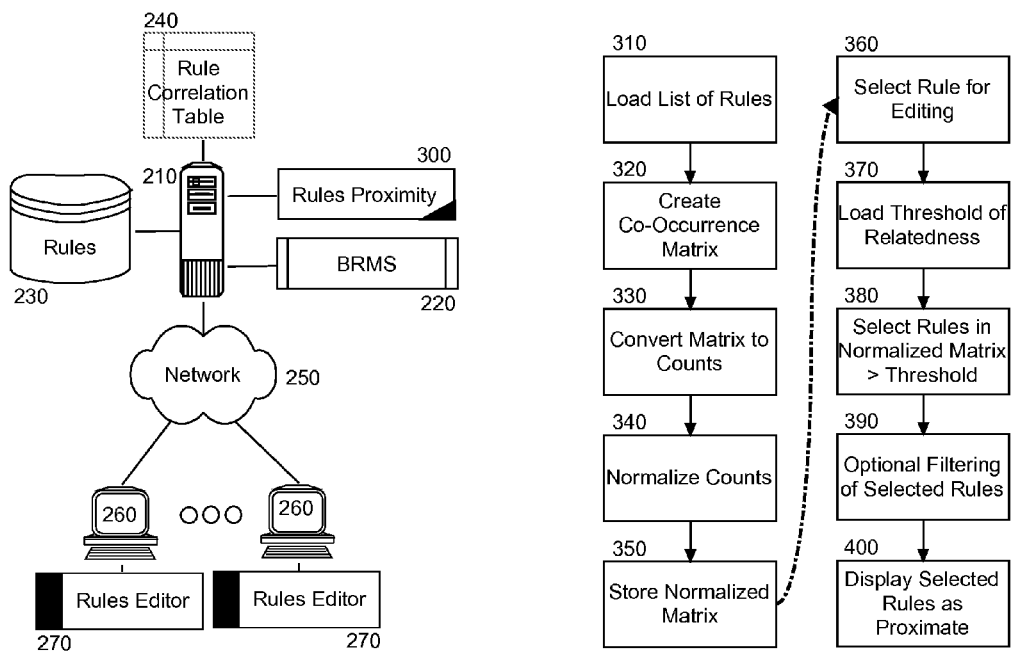
FIG. 2 is a schematic illustration of a BRMS configured for providing contextual feedback of rules proximity based on co-occurrence history; and, FIG. 3 is a flow chart illustrating a process for providing contextual feedback of rules proximity based on co-occurrence history in a BRMS.

The process described in connection with FIG. 1 can be implemented within a BRMS. In yet further illustration, FIG. 2 schematically shows a BRMS configured for providing contextual feedback of rules proximity based on co-occurrence history. The system can include a host server 210 including at least one processor and memory providing a computing environment to support a BRMS 220. The BRMS 220 in turn can be coupled through the host server 210 to a data store of rules 230 applicable by the BRMS 220 as one or more execution units. Finally, the BRMS 220 can be accessed by different client computers 260 over computer communications network 250.

Of note, rules proximity logic 300 can be coupled to the BRMS 220 by way of the host server 210. The rules proximity logic 300 can include program code enabled to generate a rule correlation table 240. The rule correlation table 240 can include different records of different rules indicating a number of common inputs shared by the different rules such that querying the rule correlation table 240 with a selected rule can return a listing of other rules sharing one or more common inputs. The rule correlation table 240 additionally can be configured to return for a selected rule a listing of other rules sharing a threshold number of common inputs. Finally, the number of shared common inputs indicated for each rule in the rule correlation table can be normalized to unity for rules whose inputs are identically present in another of the rules. In the latter instance, the rule correlation table 240 can be configured to return for a selected rule a listing of other rules having a normalized value that exceeds a specified threshold.

In operation, an end user can edit a selected rule requiring one or more inputs. The program code of the rules proximity logic 300 can query the rule correlation table 240 with the selected rule to identify a list of related rules having a threshold number of inputs in common to the selected rule. Alternatively, the program code of the rules proximity logic 300 can query the rule correlation table 240 with the selected rule to identify a list of related rules having a normalized value related to a number of inputs in common to the selected rule wherein the normalized value exceeds a threshold. In either circumstance, the list of related rules can be presented in the rules editor 270 in association with the selected rule so as to provide a visual display of rules related the rule selected for editing.

In even yet further illustration of the operation of the rules proximity logic 300, FIG. 3 is a flow chart illustrating a process for providing contextual feedback of rules proximity based on co-occurrence history in a BRMS. Beginning in block 310, a list of rules previously applied in the BRMS can be retrieved into memory along with an indication of inputs utilized by each of the rules in the list. In block 320, a co-occurrence matrix can be created in a table correlating rules to one another according common inputs utilized by the rules. In block 330, for each of the correlated rules, a listing of common inputs can be reduced to a count of common inputs. Thereafter, in block 340 the counts can be normalized to unity where as unity as a value is applied only to rules which always occur together. Finally, the normalized matrix can be stored as the rule correlation table, as illustrated in block 350.

In block 360, a rule can be selected for editing in a rule editor. In block 370, a threshold of relatedness can be established and in block 380, other rules correlated to the selected rule by at least the threshold of relatedness can be selected according to the normalized matrix. Optionally, in block 390 the selected rules can be filtered according to one or more criteria, such as a key word or meta-data for the rule. Finally, in block 400 the selected rules can be displayed in connection with the editing of the selected rule in the rule editor.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. With specific reference to a computer readable storage medium, it is to be understood that a computer readable storage medium excludes transitory media such as transitory signals and other propagation media.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A rules editing system comprising:
a computer with memory and at least one processor;
a datastore of rules previously applied utilizing different inputs;
a rule correlation table disposed in the memory of the computer correlating the rules in the datastore with one another according to common ones of the inputs to which the rules had been applied previously;
a rules editor configured to edit a selected one of the rules in the datastore; and,
rules proximity logic executing in the memory of the computer and enabled to identify different rules in the datastore that also had been applied to an input in common with the selected one of the rules in the rules editor, and to display the identified different rules in the rules editor in connection with the selected one of the rules.

2. The system of claim 1, wherein rules had been previously applied in a business rules management system (BRMS).

3. The system of claim 1, wherein the rules proximity logic is enabled to identify in a rule correlation table different rules having respective counts of common inputs for the selected one of the rules that exceeds a threshold value.

4. The system of claim 1, wherein the rules proximity logic is enabled to identify in a rule correlation table different rules having respective normalized values derived from corresponding respective counts of common inputs for the selected one of the rules that exceeds a threshold value.

5. The system of claim 1, wherein the rules proximity logic is enabled to first filter the identified different rules before displaying the filtered identified different rules in the rules editor in connection with the selected one of the rules.

6. A computer program product for providing contextual feedback of rules proximity based on co-occurrence history, the computer program product comprising:
a computer readable storage medium having computer readable program code embodied therewith, the computer readable program code comprising:
computer readable program code for selecting a rule for editing in a rules editor executing in memory of a computer;
computer readable program code for identifying different rules also having been applied to an input in common with the selected rule; and,
computer readable program code for displaying the identified different rules in the rules editor in connection with the selected rule.

7. The computer program product of claim 6, wherein the computer readable program code for selecting a rule for editing in a rules editor executing in memory of a computer, comprises computer readable program code for selecting a rule for editing in a rules editor of a business rules management system (BRMS) executing in memory of a computer.

8. The computer program product of claim 6, wherein the computer readable program code for identifying different rules also having been applied to an input in common with the selected rule, comprises computer readable program code for identifying in a rule correlation table different rules having respective counts of common inputs for the selected rule that exceeds a threshold value.

9. The computer program product of claim 6, wherein the computer readable program code for identifying different rules also having been applied to an input in common with the selected rule, comprises computer readable program code for identifying in a rule correlation table different rules having respective normalized values derived from corresponding respective counts of common inputs for the selected rule that exceeds a threshold value.

10. The computer program product of claim 6, wherein the computer readable program code for displaying the identified different rules in the rules editor in connection with the selected rule, comprises:
computer readable program code for filtering the identified different rules; and,
computer readable program code for displaying the filtered identified different rules in the rules editor in connection with the selected rule.

* * * * *